Patented Dec. 29, 1931

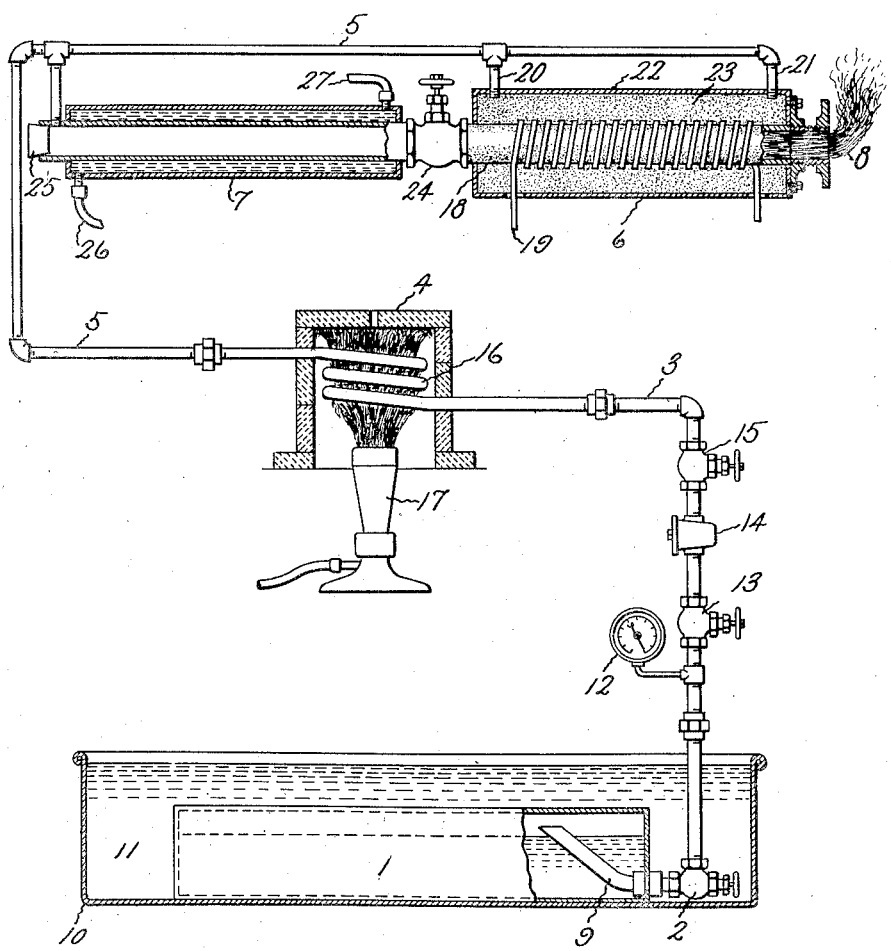

1,839,185

UNITED STATES PATENT OFFICE

PETER P. ALEXANDER, OF MARBLEHEAD, MASSACHUSETTS, ASSIGNOR TO GENERAL ELECTRIC COMPANY, A CORPORATION OF NEW YORK

METHOD OF UNITING METAL PARTS

Application filed July 3, 1928. Serial No. 290,182.

Broadly my invention relates to a method of and apparatus for uniting in the presence of a selected gas two or more metal parts or pieces by means of another or fusing metal which has a lower melting point than that of the metal parts. More specifically my invention relates to a new and improved method of and apparatus for hydrogen brazing.

Hydrogen brazing, as the term implies, denotes the method of uniting two or more metal parts by fusing therebetween a binder of cuprous metal while surrounding the parts with an atmosphere of hydrogen. The hydrogen appears to act as a flux, cleansing the surfaces of the parts to be united and causing the cupreous metal to wet them and to flow freely over them. The hydrogen also acts to prevent oxidation of the metal parts when subjected to the fusing heat.

It is a generally accepted fact that a slight amount of water vapor or moisture in the hydrogen is sufficient to prevent the proper working of the process. If the hydrogen is produced by an electrolytic process the gas at its origin is contaminated with moisture and if the gas is initially free of moisture, by reason of the method of storing it in a gasometer with water seals or the act of passing it through a safety device to prevent flashbacks, the most satisfactory of which make use of water as the sealing liquid, the gas is contaminated with moisture. Under such conditions the subsequent drying of the gas is effected only during the first few hours of running of the apparatus. The presence of moisture may be avoided by starting with a dry gas and using a dry flashback or no flashback at all but this introduces the danger of explosions due to the possibility of the gas flame travelling back to the source of supply of hydrogen.

It is an object of my invention to overcome these difficulties by supplying to the brazing furnace a reducing gaseous atmosphere suitable for hydrogen brazing which is free of moisture, less explosive than hydrogen and more readily available than hydrogen and in most instances cheaper than hydrogen when produced by the usual methods.

According to my invention I use in place of hydrogen a mixture of hydrogen and nitrogen consisting of 75% hydrogen and 25% nitrogen. I obtain this gaseous mixture from a supply of liquid anhydrous ammonia. Since I start with an anhydrous compound the gas produced from it is absolutely dry. Furthermore the anhydrous ammonia may be stored in a compressed liquefied form which eliminates the necessity of gasometers and since the ammonia is dissociated according to my method just prior to its admission into the brazing furnace and since the undissociated ammonia is neither explosive nor inflammable there is no need of employing flashbacks. Furthermore the dilution of hydrogen with nitrogen reduces to some extent the danger from explosion otherwise attendant when using pure hydrogen.

The novel features which I believe to be characteristic of my invention are set forth with particularity in the appended claims. The invention itself, however, will best be understood by referring to the following specification taken in connection with the accompanying drawing which diagrammatically illustrates apparatus suitable for carrying into effect my improved method of hydrogen brazing.

Referring to the drawing anhydrous ammonia gas is supplied from a container 1 of liquid anhydrous ammonia through a needle valve 2 and suitable piping 3, to a dissociator 4 where it is broken up into its constituent elements hydrogen and nitrogen which are then supplied through piping 5 to the brazing furnace 6 and to a cooling chamber 7 placed adjacent thereto. At the open end of the furnace 6 the gas escapes into the air and burns with a flame 8. There is no free circulation of gas in the cooling chamber 7 except when objects are being discharged from the furnace therein or when said objects are being removed from the chamber.

In the drawing, the liquid anhydrous ammonia tank is shown located in a horizontal position. When located in this position the intake pipe 9 should extend above the level of the liquid in the tank to ensure that evaporation takes place in the tank. This eliminates any danger of freezing the valves or pressure regulator in the pipe line leading from the tank to the dissociator. If the tank is placed in a vertical position with the valve at the top of the tank an intake pipe such as 9 is not necessary.

Since in the tank we have a system of two phases, that is, liquid and saturated vapor in contact with the liquid, for any given temperature the vapor pressure in the tank will be constant. At 60° F. this pressure is 107.7 pounds per square inch. This condition ensures a perfectly constant pressure of the gas in the tank until the liquid is entirely evaporated. Thereafter a falling off in gas pressure will indicate that the supply of liquid ammonia has become exhausted and that a new tank will soon be needed.

Since evaporation in the tank when placed in a horizontal position as illustrated takes place over a large surface of liquid the cooling of the liquid will be very gradual and uniform under usual operating conditions. The gradual absorption of heat during the evaporation of the liquid ammonia within the tank will be counterbalanced by the conduction of heat thereto from external objects and the air surrounding the tank so that the temperature of the ammonia in the tank will never fall below a certain value. Consequently, it will not always be necessary to place the ammonia container in a tank 10 filled with a liquid 11, as illustrated in the drawing, for maintaining the temperature of the liquid ammonia above a certain value. If such a tank and liquid are used it is preferable to use oil instead of water in order to prevent corrosion of the tank walls of the container 1.

The ammonia gas after passing through the needle valve 2 passes by a pressure gauge 12, and thence through a high pressure valve 13, a reducing valve 14, and a low pressure valve 15 into the coil 16 of the dissociator 4. The reducing valve is used to lower the pressure from 107.7 pounds per square inch (at 60° F.) to a pressure of from 1 to 5 pounds per square inch which is sufficient to cause the desired quantity of gas to flow through the furnace. The coil 16 which is filled with iron filings which act as a catalyst is raised to a temperature of about 1000° C. by a suitable means illustrated, for example, as a Bunsen burner 17. Within this coil 16 the ammonia is completely dissociated into its constituent elements hydrogen and nitrogen which mixture passes directly through the pipe 5 to the brazing chamber.

It is absolutely essential that the ammonia gas be completely dissociated or in other words that no ammonia, as such, be supplied to the articles in the brazing furnace 6 since ammonia will combine chemically with iron. Even traces of ammonia in the gas will attack ferrous metals forming cracks therein. The success of the process consequently depends upon the complete absence of ammonia in the gaseous mixture used for brazing. For this reason the pipe line 3 and the pipe in the dissociator 16 must be formed of a chrom-iron alloy or a similar metal which can successfully resist the action of ammonia. The coil 16 of the dissociator must also be not only ammonia resistant but also heat resistant. The pipe line 5 which conducts the gaseous mixture of hydrogen and nitrogen resulting from the dissociation of ammonia need not be of such special composition since the gaseous mixture will not attack the pipe as will the ammonia gas. Consequently, ordinary carbon steel pipe may be used in the pipe line 5.

The particular furnace 6 illustrated in the drawing comprises a porous alundum tube 18 about which is wrapped a molybdenum resistor 19 through which electric current is passed from a suitable source, not shown, to generate the necessary heat within the tube which when using copper as the brazing material should be about 1100° C. The mixture of hydrogen and nitrogen produced in the dissociator 16 is supplied at 20 and 21 through a casing 22 surrounding the alundum tube 18 and separated therefrom by a porous insulating compound 23 such as quartz sand. The gaseous mixture penetrates this compound 23 and filters through the pores of the alundum tube 18 into the interior thereof completely surrounding the work parts which are placed within the tube in assembled relationship. The work parts are temporarily held in assembled relationship by wire or clamps and the binding metal inserted between the parts or along the joint between the parts. When the binding metal is placed along the joint between the parts it is drawn when molten by capillary attraction between the parts. After the binding metal has been fused and the parts united thereby the parts are allowed to cool preferably in a cooling chamber adjacent the furnace and upon the solidification of the interjacent brazing material the parts are firmly bound together thereby. The cooling chamber 7 shown in the drawing is connected to the furnace 6 by a gate valve 24 and is closed at its left end by a plug 25. The chamber may be cooled by a circulation of water through supply pipes 26 and 27.

The method of operation is as follows: Valve 13 is closed and needle valve 2 opened. The dissociator 4 is then brought to a temperature of about 1000° C. whereupon the valve 13 is opened and the ammonia allowed to flow through the ammonia reducing valve 14 and through a low pressure valve 15 into the dissociator. Upon entering the dissociator the ammonia is entirely dissociated into a mixture of 75% hydrogen and 25% nitrogen. This gaseous mixture is conducted into the furnace 6 wherein the brazing operation is performed. The work parts in the furnace 6 suitably bound together and provided with an insert metal are raised to a temperature of about 1100° C. if copper is used as the fusing metal and maintained at that temperature until the brazing operation is completed. Thereupon the valve 24 is opened and the parts removed from the furnace chamber 6 into the cooling chamber 7 where they remain in an atmosphere of the same mixture of hydrogen and nitrogen as is supplied to the furnace until they have cooled sufficiently for the articles to be removed without scaling in air. From the cooling chamber 7 the parts may be removed through the opening normally closed by the plug 25.

A 100 pound tank of anhydrous ammonia will give about 4500 cubic feet of gaseous mixture consisting of 75% hydrogen and 25% nitrogen. The present cost of anhydrous ammonia is about 11 cents per pound which makes the cost of the mixture about .24 cents per cubic foot. The present cost of hydrogen when sold in compressed form is about 1.5 cents per cubic foot and when produced by the electrolytic method about 1 cent per cubic foot for small installations. It thus appears that my method of brazing has a great economic advantage over the previous method of brazing using hydrogen. Furthermore, it makes available a cheap, safe and perfectly dry gas in localities where previously hydrogen brazing could not be performed by reason of the lack of a suitable supply of hydrogen or means for producing hydrogen.

Another advantage of my method is that it renders the operation of brazing furnaces independent of the hydrogen plant if such a plant is available for supplying the hydrogen. Thus when it is necessary to run the furnaces over week-ends or when the hydrogen plant fails it is not necessary to shut down the brazing furnaces. Under conditions where my process could not compete economically with the producton of hydrogen on a large scale apparatus suitable for applying my invention may be installed and used in emergencies when the main supply of gas is not available.

Photo-micrographs of metal parts brazed in the manner just described show that the nitrogen present in the hydrogen-nitrogen mixture resulting from the dissociation of ammonia does not combine with the metal. The surfaces of the parts are found to be decarburized to about a depth of $\frac{1}{16}$ inch but below this surface layer the carbon content of the work parts is normal. This decarburation of the exposed surface is characteristic of the hydrogen brazing process. The physical properties of the metal are not altered below the surface and the change in strength and elongation of the parts is only such as would be expected in the metal when subjected to the same temperature for the same lengths of time as they are in the furnace during the brazing operation. It is not necessary to use pure copper in performing the brazing operation according to the present method since the same effect may be obtained by using alloys of copper such as Tobin bronze, phosphor bronze and the like.

What I claim as new and desire to secure by Letters Patent of the United States is:—

1. Apparatus for joining metal parts by means of a fusing metal which comprises a container for liquid anhydrous ammonia, means for withdrawing gaseous ammonia from said container, means for completely dissociating said gaseous ammonia, means for supplying said gaseous ammonia to said dissociating means, a chamber into which the parts to be joined are inserted, means for heating said chamber, a second chamber adjacent said heating chamber, means for cooling said chamber, and means for supplying said dissociated ammonia to said heating chamber and said cooling chamber.

2. Apparatus for joining metal parts by means of a fusing metal which comprises a container for liquid anhydrous ammonia, means for withdrawing gaseous ammonia from said container, ammonia dissociating means, means or supplying said gaseous ammonia to said dissociating means, regulating means for controlling the amount of gaseous ammonia supplied to said dissociating means, a chamber for the parts to be joined, means for heating said chamber to heat the metal parts to be joined and said fusing metal, and means for supplying the dissociated ammonia to said chamber.

3. The steps in the method of uniting ferrous metal objects in a reducing atmosphere by an interjacent brazing metal of lower fusing point, of completely dissociating anhydrous ammonia into its constitutent elements hydrogen and nitrogen and performing the brazing operation in the presence of said elements.

In witness whereof, I have hereunto set my hand this 30th day of June, 1928.

PETER P. ALEXANDER.